Jan. 2, 1968 J. L. EAVES 3,361,972
AUTOMATIC LOG SLOPE ADJUSTMENT SYSTEM
Filed Oct. 20, 1964 4 Sheets-Sheet 1
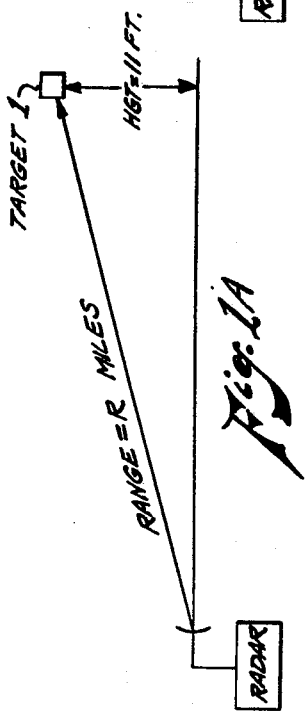
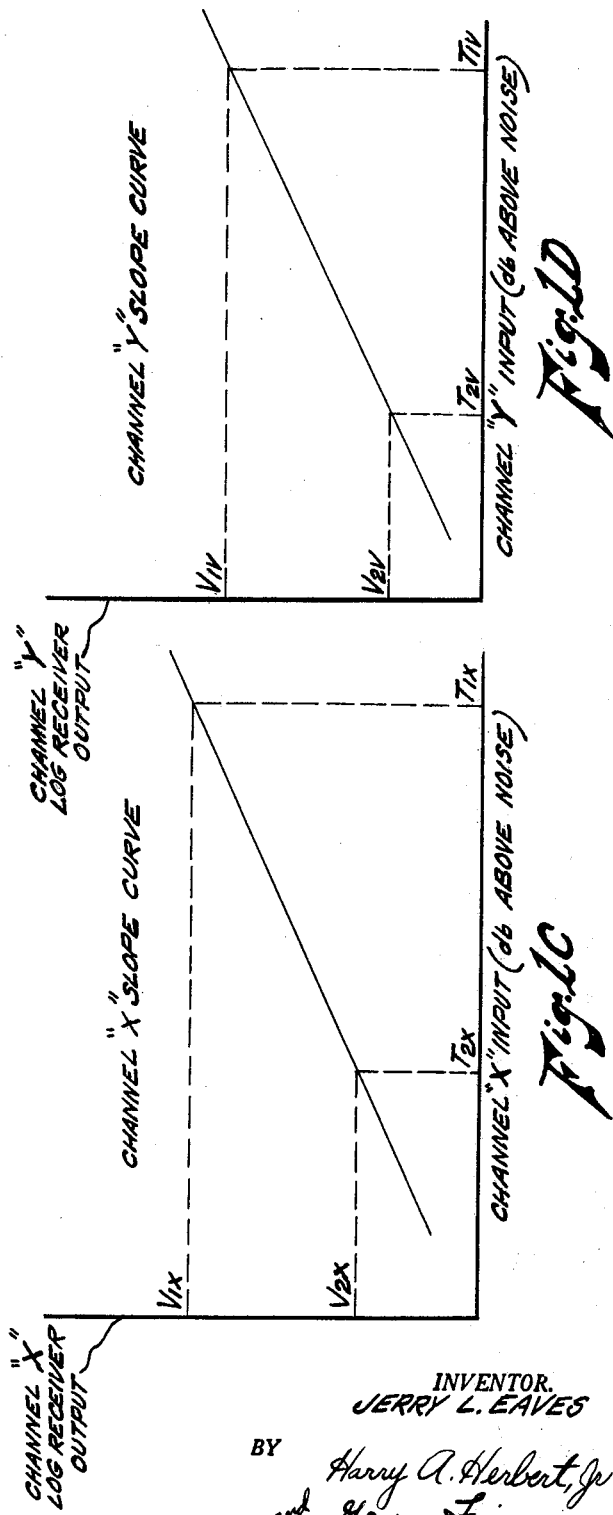
INVENTOR.
JERRY L. EAVES
BY Harry A. Herbert, Jr.
and George Fine
ATTORNEYS

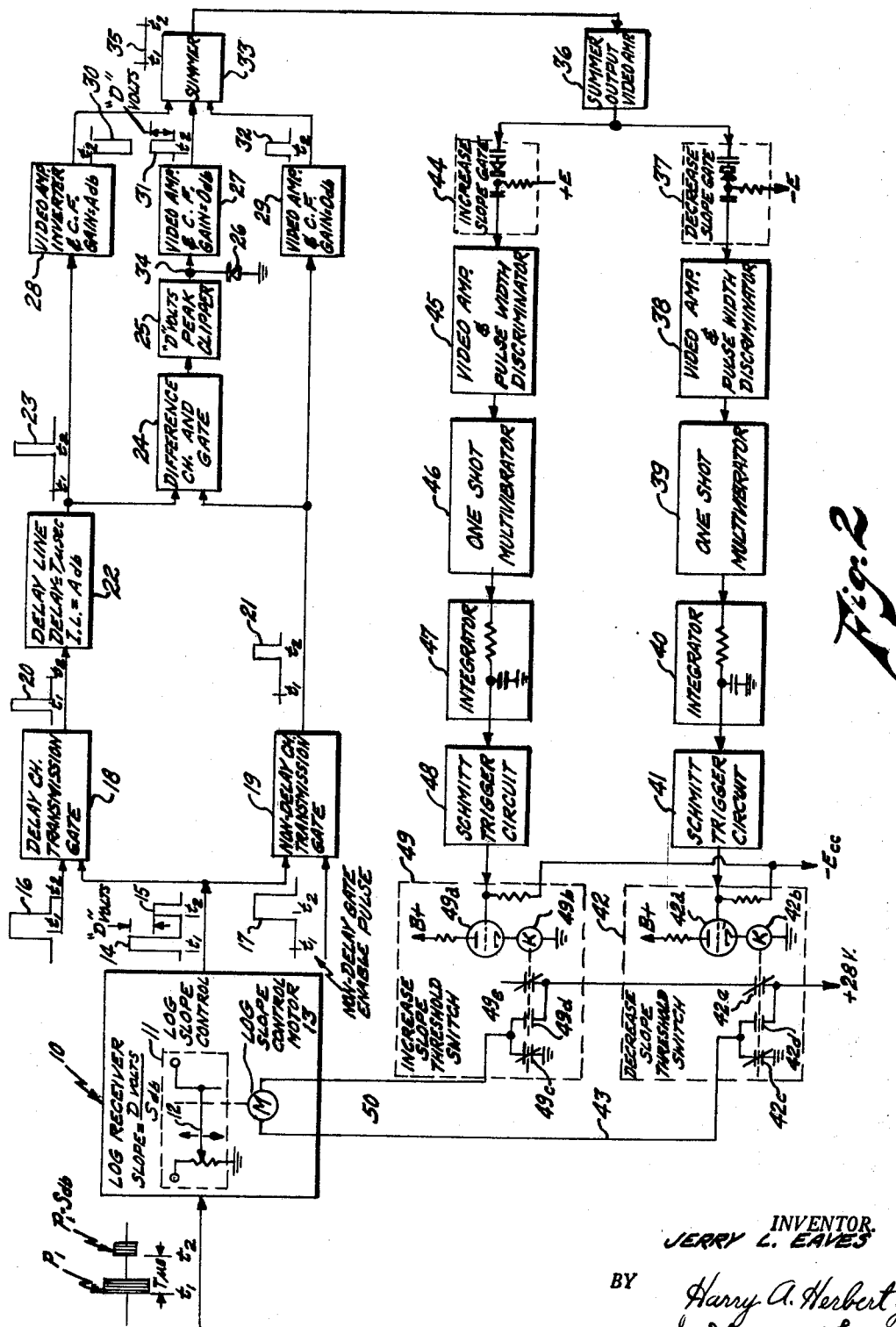

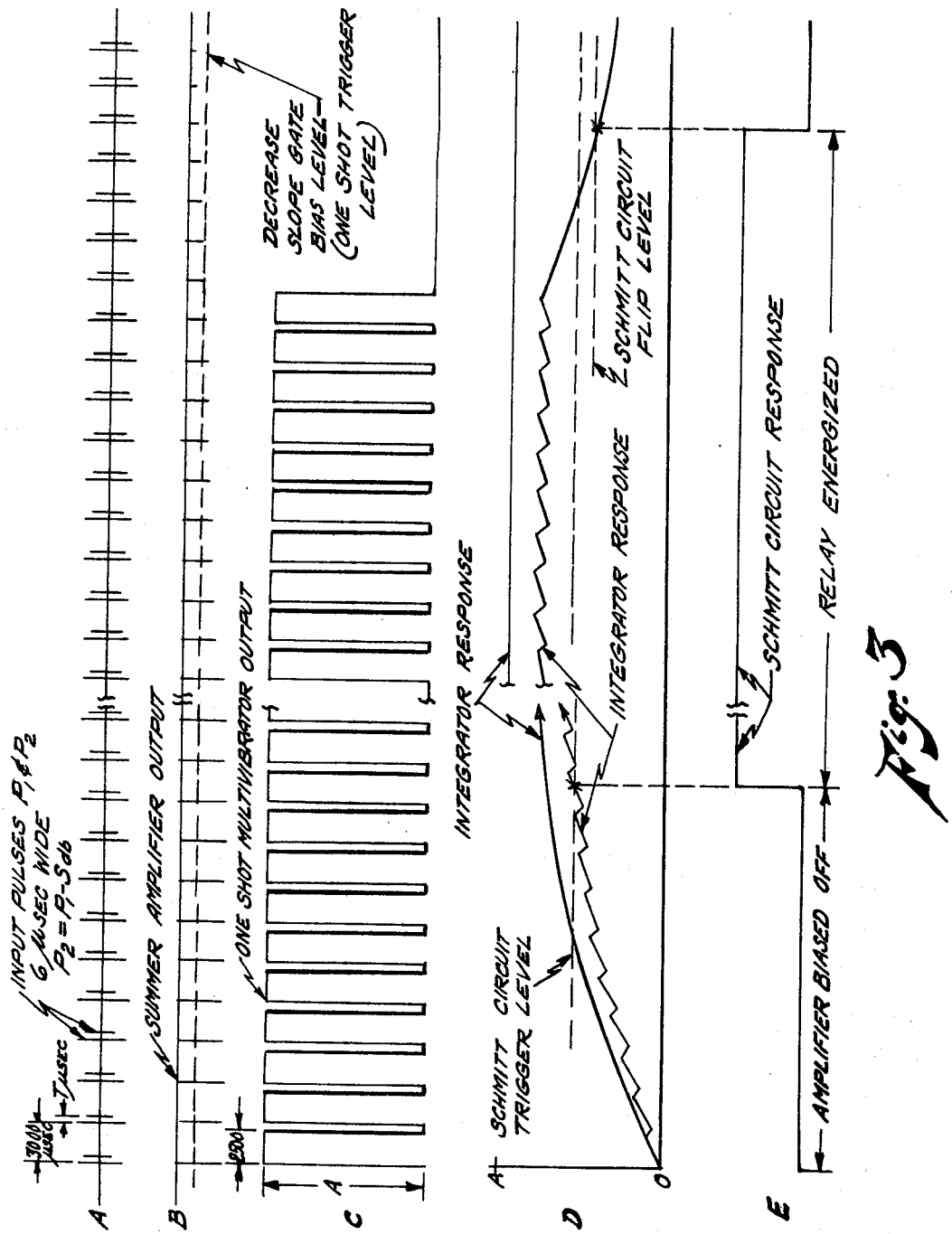

United States Patent Office 3,361,972
Patented Jan. 2, 1968

3,361,972
AUTOMATIC LOG SLOPE ADJUSTMENT SYSTEM
Jerry L. Eaves, Mableton, Ga., assignor, by mesne assignments, to the United States of America as represented by the Secretary of the Air Force
Filed Oct. 20, 1964, Ser. No. 405,305
4 Claims. (Cl. 325—395)

This invention relates to a system for automatically adjusting the log slope of the input versus output curve of Log Receivers in a multiple channel type radar.

In a search type radar having, for example, ten individual receiver channels. The channel in which a target signal is received depends on the range and height of target. A height finding requirement is that the slopes of the response curves for the receiver channels in the Log Receiver be equal (i.e., for equal changes to the input signals to each channel, the signal changes at the Log Receiver outputs must be equal for each channel).

In one of the prior art radar systems, the Log Receiver slopes were set manually and adjusted manually when they varied out of tolerance. However, in many instances slope variations, after the initial adjustment, have necessitated repeating the manual slope adjustment procedure several times in our eight hour period.

In accordance with the present invention there is produced continuous automatic slope adjustment in each channel by injecting two test pulses into the Log Receiver of each channel every 3000 μsec. The log slope of the Log Receiver initially is set to a preselected value. If for some reason the slope of the Log Receiver deviates from its preselected value, then these test pulses will produce error pulses. These error pulses will then trigger a One Shot Multivibrator to produce output pulses which are integrated. After a predetermined number of pulses from the One Shot Multivibrator, the integrator output will trigger a Schmitt trigger circuit. The Schmitt circuit will then bias an increase or decrease slope threshold switch to cause the Log Receiver Slope Control Motor to rotate in a direction which will return the log slope of the Log Receiver of the particular channel to its preselected value.

An object of the present invention is to provide a system for automatic slope adjustment of a Log Receiver wherein the log slope of the Log Receiver has initially been set to a preselected value and the system returns the log slope automatically to its preselected value wherever a variation occurs therefrom.

Another object of the present invention is to provide a system for automatically adjusting the log slope of a Log Receiver to a preselected value wherever there is a variation therefrom.

Yet another object of the present invntion is to provide an automatic slope adjustment system for a multiple receiver channel radar wherein the log slope of each of the Log Receivers in each of the channels is initially set to a preselected value and the adjustment system automatically returns the log slope to its preselected value wherever a variation occurs therefrom.

The novel features that I consider charcteristic of my invention are set forth with particularity in the appended claims. The invention itself, however both as to its organization and its method of operation, together with additional objects and advantages thereof, will be understood from the following description of a specific embodiment thereof when read in connection with the accompanying drawings, in which:

FIGURES 1A, 1B, 1C and 1D illustrate the necessity of having equal log slopes in each channel of multiple channel system;

FIGURE 2 is a diagram of a single channel in a multiple channel system, partly in block and partly in schematic, showing a preferred embodiment of my invention;

FIGURE 3 illustrates the various waveforms associated with the single channel shown in FIGURE 2.

Figure 4:
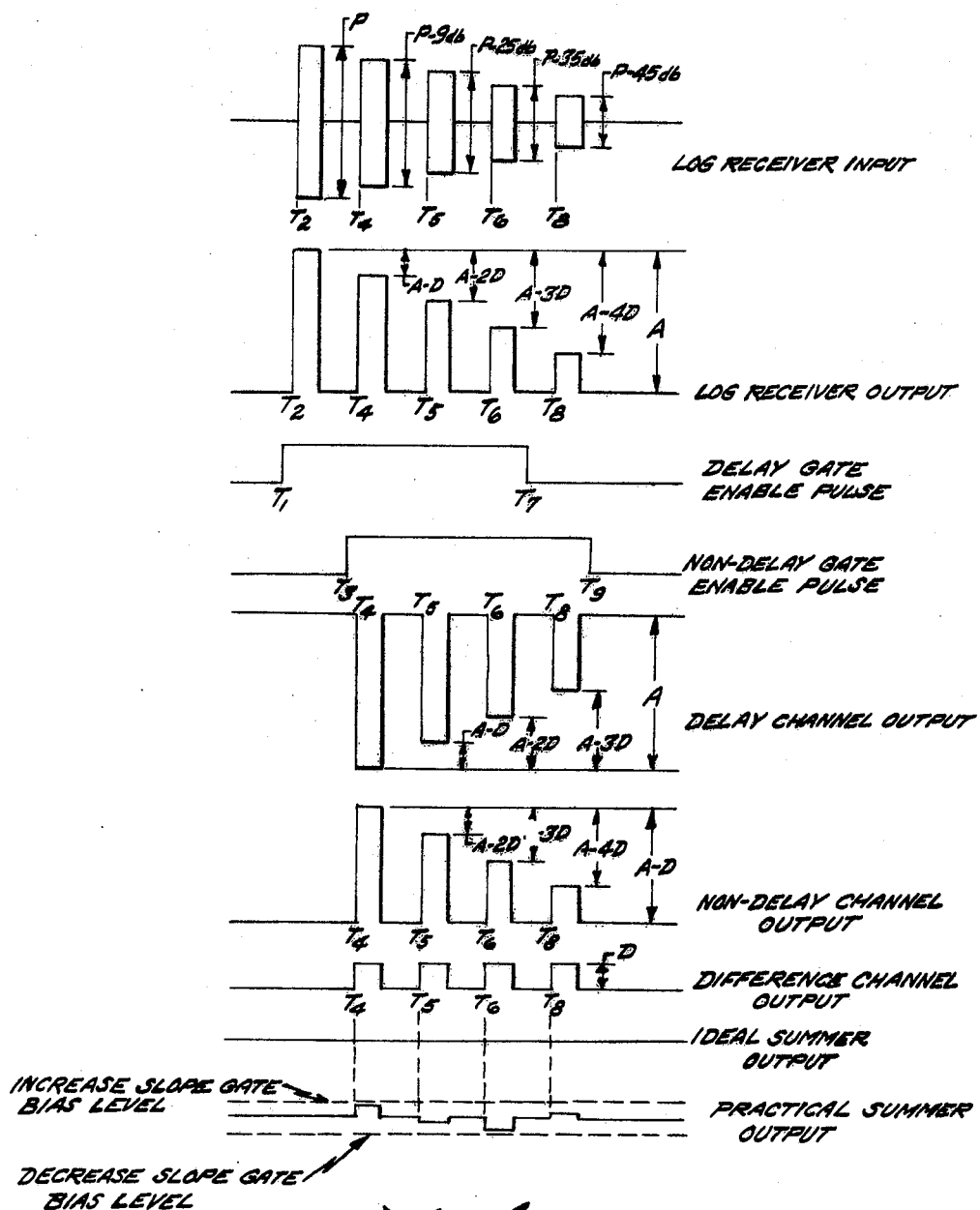
FIGURE 4 illustrates the waveforms to be utilized for checking the entire dynamic range of the channel illustrated in FIGURE 2.

Height information is derived by subtracting the outputs of adjacent receiver channels in the Log Receiver. When a target is received by two adjacent channels, the difference between the Log Receiver outputs for the two channels is proportional to the angle $\theta i$ formed between the target and the base angle $\theta_B$. $\theta_B$ is the elevation angle at which a target would reflect equal amounts of energy to both channels. The necessity of having equal log slopes in each channel is illustrated by FIGURES 1C and 1D showing log slope curves for adjacent channels X and Y, respectively. FIGURES 1A and 1B are associated with curves of FIGURES 1C and 1D, respectively.

The equations associated with FIGURE 1 are as follows:

(1) $$\text{CHANNEL X SLOPE} = \frac{V_{1x} - V_{2x}}{T_{1x} - T_{2x}}$$

(2) $$\text{CHANNEL Y SLOPE} = \frac{V_{1y} - V_{2y}}{T_{1y} - T_{2y}}$$

The radar antenna is designed such that (3) $$T_{1x} - T_{2x} = T_{1y} - T_{2y} = \Delta T$$

and (4) $$V_{1x} - V_{1y} = C\theta_{11}$$

(5) $$V_{2x} - V_{2y} = C\theta_{12}$$

Where $\theta_i$ is that angle formed between a target and $\theta_B$, the angle of equal target returns to CH.X and CH.Y.

Substituting (3) into (1) and (2) gives (6) $$\text{CH.X SLOPE} = \frac{V_{1x} - V_{2x}}{\Delta T}$$

(7) $$\text{CH.Y SLOPE} = \frac{V_{1y} - V_{2y}}{\Delta T}$$

Since target 1 and target 2 are at the same height and range it is required that (8) $$C\theta_{11} = C\theta_{12}$$

Then from (4) and (5)

(9) $$V_{1x} - V_{1y} = V_{2x} - V_{2y}$$

Rearranging terms gives

(10) $$V_{1x} - V_{2x} = V_{1x} - V_{2y}$$

Dividing both sides of (10) by $\Delta T$ gives

(11) $$\frac{V_{1x} - V_{2x}}{\Delta T} = \frac{V_{1y} - V_{2y}}{\Delta T}$$

And from (6) and (7) we hav

(12) $$\text{CH.X SLOPE} = \text{CH.Y SLOPE}$$

Therefore, Equation 12 is required to be true in order that the radar provide identical height information for Target 1 and Target 2.

Now referring in detail to FIGURE 2 which shows a one channel diagram of the automatic slope adjustment system of the present invention which will maintain the log slope of the Log Receiver to be $D/S$ volts per db. One automatic slope adjustment system is required for each of the multiple Log Receiver channels and the operation of each is identical.

There is shown Log Receiver 10 included therein is log slope control unit 11 which is a potentiometer having movable arm 12 interconnected with log slope control motor 13. The adjustment of log potentiometer controls the slope of the receiver. The slope of Log Receiver 10 has been initially set to $D/S$ volts per db. Two six $\mu$sec. I.F. test pulses $P_1$ and $P_2$ are fed into the input of Log Receiver 10. $P_2$ occurs $T$ $\mu$sec. later than $P_1$ and is attenuated by $S$ db below the level of $P_1$. $P_1$ and $P_2$ start at times $t_1$ and $t_2$, respectively. The output from Log Receiver 10 are two six $\mu$sec. video pulses 14 and 15 separated by $T$ $\mu$sec., and second pulse 15 has an amplitude that is $D$ volts less than first pulse 14. Pulses 14 and 15 start at times $t_1$ and $t_2$, respectively. At the output of Log Receiver 10, there is provided delay channel transmission gate 18 and non-delay channel transmission gater 19, each of which having a pair of inputs. Delay transmission gate 18 receives at one of its inputs pulses 14 and 15 and at the other input, delay gate enable pulse 16. Delay gate enable pulse 16 has indicated thereupon times $t_1$ and $t_2$ for the desired operation and it may be supplied by a pulse source from the associated radar or any other conventional pulse source. Non-delay transmission gate 19 receives at one of its inputs pulses 14 and 15 and at the other input, non-delay gate enable pulse 17. Non-delay gate enable pulse 17 has indicated thereupon times $t_1$ and $t_2$ for the desired operation and it may be supplied by a pulse source from the associated radar system or any other conventional pulse source. Delay gate enable pulse 16 enables delay transmission gate 18 to pass pulse 14 but pulse 15 is blocked. The output therefrom is shown as pulse 20 with times $t_1$ and $t_2$ indicated thereupon. Non-delay gate enable pulse 17 enables non-delay transmission gate 19 to pass pulse 15 and block pulse 14. The output therefrom is shown as pulse 21 with times $t_1$ and $t_2$ indicated thereupon.

Delay line 22 receives at the input pulse 20 and provides at the output thereof delayed pulse 23. Delay line 22 provides a delay of $T$ $\mu$sec. and an attenuation of $A$ db. Delayed pulse 23 and pulse 21 appears coincidently at the input of Difference Channel And Gate 24; And Gate 24 output is a 6 $\mu$sec. pulse that is coincident in time with delayed and non-delayed pulses. The 6 $\mu$sec. pulse is clipped by peak clipper 25 and at the output thereof appears a 6 $\mu$sec. positive pulse having an amplitude of $D$ volts. Line 34 interconnects peak clipper 25 and video amplifier and cathode follower circuit 27. Line 34 is connected to ground by way of diode 26. The output from video amplifier and cathode follower 27 is shown as pulse 31 which starts at time, $t_2$.

Attenuated delayed pulse 23 is amplified by $+A$ db and inverted in phase by delay channel video amplifier, inverter and cathode follower circuit 28 and the output thereof appears as pulse 30 beginning at time, $t_2$. Non-delayed pulse 21 does not have the amplitude and phase thereof altered by video amplifier and cathode follower circuit 29 and at the output thereof appears pulse 32 beginning at time, $t_2$. It is also to be noted that the difference pulse appearing at the output of peak clipper 25 is not changed in phase or amplitude by video amplifier and cathode follower circuit 27 and appears at the output thereof as pulse 31 beginning at time, $t_2$.

Pulses 30, 31 and 32 are applied to Summer 33 and are added together therein to give a zero output as shown at waveform 35; therefore Summer output video amplifier 36 will not have an input.

It is seen that for a Log Receiver slope of $D/S$ volts per db the Summer output is zero and no slope error is detected.

Now with slope test pulses $P_1$ and $P_2$ injected into the input of Log Receiver 10 every 3000 $\mu$sec. as illustrated in the waveforms of FIGURE 3A and for some reason the slope of Log Receiver 10 increases to $C/S$ volts per db (i.e., $C$ is greater than $D$). Then the amplitude difference between the two Log Receiver video output pulses is $C$ volts. It is obvious that Summer 33 output will be negative 6 $\mu$sec. pulses that are $C$–$D$ volts in amplitude; these slope error pulses will be amplified by Summer output video amplifier 36 and then passed through decrease slope gate circuit 37 providing the error pulse amplitudes are greater than the gate bias voltage $E$ as illustrated in the waveforms of FIGURE 3B. It is to be noted that video amplifier and pulse width discriminator 38 is interposed between decrease slope gate 37 and One Shot Multivibrator 39.

When the slope error pulses exceed the bias voltage $E$, One Shot Multivibrator is triggered by each error pulse and produces positive output pulses that are about 2500 $\mu$sec. wide as illustrated in the waveforms of FIGURE 3C. The 2500 $\mu$sec. pulses are summed in integrator circuit 40. After a predetermined number of pulses from One Shot Multivibrator 39 the output of integrator 40 and Schmitt trigger circuit 41 are illustrated in FIGURE 3D.

Schmitt trigger circuit 41 is followed by decrease slope threshold switch 42 which consists of normally biased off amplifier 42a having relay 42b in its cathode circuit. When Schmitt trigger circuit 41 is triggered by the output from integrator 40, biased off amplifier 42a is brought into conduction thereby energizing cathode relay 42b. Relay contacts 42c and 42e, which are normally closed, open and relay contact 42d, normally open, closes thus +28 v. DC is sent to Log Receiver log slope control motor 13 by way of line 43.

Log slope control motor 13 rotates in the direction that causes the log slope to decrease. Eventually the slope error pulses will not exceed the decrease slope gate bias voltage; therefore One Shot Multivibrator 39 will not be triggered as may be seen by examining the waveforms of FIGURES 3B and 3C. The output of integrator 40 will decrease through the value at which Schmitt circuit 41 flips and causes conducting amplifier 42a to be biased off, thereby de-energizing cathode relay 42b and breaking the +28 v. DC circuit to slope motor 13 as may be seen by examining the waveforms of FIGURES 3D and 3E.

From the waveforms illustrated in FIGURE 3, it is seen that the rate of slope adjustment and the Schmitt circuit flip time could be arranged so that the slope error pulses would always be reduced to zero amplitude or to the optimum compromise amplitude.

The above description of operation is for the log slope being too high; the description of operation for the slope being too low is exactly the same except the error pulses would be positive and the slope control motor would rotate in the direction that would cause the log slope to increase.

The output from difference channel And Gate 24 serves a dual purpose, in addition to being the pulse from which the difference pulse is derived, the And Gate output is a test pulse for checking the proper delay of delay line 22. Since the And Gate inputs are non-delayed pulse 21 and the delayed pulse 23, the correct delay time is obtained when delay line 22 is adjusted for maximum pulse width at the And Gate output.

The pulse width discriminators in video amplifiers and pulse width discriminators 38 and 45 are provided to prevent the One Shot Multivibrators 39 and 40, respectively, from being triggered by pulse spikes formed when non-delayed, delayed and difference pulses 30, 31 and 32 are added in Summer 33. The spikes will be caused by pulse rise and fall times generated in the circuits preceding Summer 33.

The waveforms illustrated in FIGURE 3 and the aforegoing descriptions of operation are for two slope test pulses $P_1$ and $P_2$ being injected into the Log Receiver. By using only two test pulses the log slope is checked between only two points of the Log Receivers dynamic range. The log slope for the entire dynamic range of the receiver could be checked by injecting several test pulses and gating the delay and non-delay channels as shown in FIGURE 4.

Although the foregoing description for an Automatic

Slope Adjustment System has been presented for a radar having multiple Log Receiver channels, a control system of this type could have many applications as it could be adapted for use in most systems requiring a DC control voltage that is a function of the amplitude difference between video pulses.

Although there has been shown and described a specific embodiment of my invention, I am fully aware that many modifications thereof are possible. My invention, therefore, is not to be restricted except insofar as is necessitated by the prior art and by the spirit of the appended claims.

What is claimed is:

1. A system for automatically adjusting the log slope of a Log Receiver to an initially preselected value upon a variation therefrom comprising a Log Receiver having the log slope thereof initially set to a preselected value, said Log Receiver receiving a pair of pulses in series, one of said pulses of said pair differing in amplitude from the other, means integrated with said Log Receiver to vary said log slope, a motor interconnected with said varying means, means at the output of said Log Receiver to provide an error signal when said log slope varies from said preselected value, and means to interconnect a direct current voltage source to said motor until said log slope returns to said preselected value, said interconnecting means being actuated by said error signal.

2. A system for automatically adjusting the log slope of a Log Receiver to an initially selected value upon a variation therefrom comprising a Log Receiver having the log slope thereof initially set to a preselected value, said Log Receiver receiving a pair of pulses in series, one of said pair of identical width pulses differing in a preselected manner in amplitude from the other and said pair of pulses being separated from each other by a preselected width, means integrated with said Log Receiver to vary said log slope, a motor interconnected with said varying means, means at the output of said Log Receiver operating to provide a zero signal output when said log slope remains at said preselected value and providing an error signal upon a variation from said preselected value, and means to interconnect a direct current voltage source with said motor until said log slope returns to said preselected value, said interconnecting means being actuated by said error signal.

3. A system for automatically adjusting the log slope of a Log Receiver to an initially preselected value upon a variation therefrom comprising a Log Receiver having the log slope thereof initially set to a preselected value, said Log Receiver receiving a pair of preselected width pulses, one of said pulses of said pair differing in amplitude from the other by a preselected magnitude and said pair of pulses being separated from each other by a preselected width, means integrated with said Log Receiver to vary said log slope, a motor interconnected with said varying means, a pair of channels at the output of said Log Receiver, the first of said channels passing the first of said pair of pulses and blocking the second, the second of said channels passing the second of said pair of pulses and blocking the first, means to delay for a preselected time said first passed pulse, means to invert said delayed pulse, a difference channel receiving said delayed pulse and said second passed pulse and providing a difference pulse, means to add said difference pulse, said inverted pulse and said second passed pulse to provide a zero signal when said log slope remains at said preselected value and an error signal upon variation from said preselected value, and means to interconnect a direct current voltage source with said motor to return said log slope to said preselected value upon variation therefrom, said interconnecting means being actuated by said error signal.

4. A system for automatically adjusting the log slope of a Log Receiver to an initially preselected value upon a variation therefrom comprising a Log Receiver having the log slope thereof initially set to a preselected value, said Log Receiver receiving a pair of preselected width pulses, one of said pulses of said pair differing in amplitude from the other and said pair of pulses being separated from each other by a predetermined width, means integrated with said Log Receiver to vary said log slope, a motor interconnected with said varying means, a pair of channels at the output of said Log Receiver, the first of said channels passing the first of said pair of pulses and blocking the second, the second of said channels passing the second of said pair of pulses and blocking the first, means to delay for a preselected time said first passed pulse, means to invert said delayed pulse, a difference channel receiving said delayed pulse and said second passed pulse and providing a difference pulse, means to add said difference pulse said inverted pulse and said second passed pulse to provide a zero signal when said log slope is at said preselected value, a negative error signal upon being too high, and a positive error signal upon being too low, and means to interconnect a direct current voltage source to said motor to return said log slope to said preselected value upon variation therefrom, said interconnecting means being actuated by said negative and positive error signals.

No references cited.

KATHLEEN H. CLAFFY, *Primary Examiner.*

R. S. BELL, *Assistant Examiner.*